US012631468B2

(12) United States Patent
Hayakawa

(10) Patent No.: US 12,631,468 B2
(45) Date of Patent: May 19, 2026

(54) OWN POSITION ERROR ESTIMATION DEVICE AND OWN POSITION ERROR ESTIMATION METHOD

(71) Applicant: AISIN CORPORATION, Aichi (JP)

(72) Inventor: Kazutaka Hayakawa, Kariya (JP)

(73) Assignee: AISIN CORPORATION, Kariya (JP)

( * ) Notice: Subject to any disclaimer, the term of this patent is extended or adjusted under 35 U.S.C. 154(b) by 49 days.

(21) Appl. No.: 18/718,536

(22) PCT Filed: Feb. 15, 2023

(86) PCT No.: PCT/JP2023/005161

§ 371 (c)(1),
(2) Date: Jun. 11, 2024

(87) PCT Pub. No.: WO2023/188927

PCT Pub. Date: Oct. 5, 2023

(65) Prior Publication Data

US 2025/0044120 A1     Feb. 6, 2025

(30) Foreign Application Priority Data

Mar. 31, 2022     (JP) ................................. 2022-059992

(51) Int. Cl.
  *G01C 21/00*     (2006.01)
  *G06T 7/70*     (2017.01)
(52) U.S. Cl.
  CPC ............ *G01C 21/3837* (2020.08); *G06T 7/70* (2017.01); *G06T 2207/30252* (2013.01)
(58) Field of Classification Search
  CPC .... G01C 21/3837; G01C 21/30; G01C 21/28; G06T 7/70; G06T 2207/30252;
  (Continued)

(56) References Cited

U.S. PATENT DOCUMENTS 7,805,242 B2 *  9/2010  Fujimoto ........... G01C 21/3844
                                                          701/450
9,103,671 B1 *  8/2015  Breed ................... G01S 13/865
  (Continued)

FOREIGN PATENT DOCUMENTS

CN     107990899 A  *  5/2018  ............. G01C 21/20
CN     111024066 A  *  4/2020  ........... G01C 21/206
  (Continued)

OTHER PUBLICATIONS

"Jiang, Guolai; et. al.; A Simultaneous Localization and Mapping (SLAM) Framework for 2.5D Map Building Based on Low-Cost LIDAR and Vision Fusion; May 22, 2019; Applied Sciences" (Year: 2019).*

(Continued)

*Primary Examiner* — Ramya P Burgess
*Assistant Examiner* — Christopher R Cardimino
(74) *Attorney, Agent, or Firm* — Sughrue Mion, PLLC

(57)     ABSTRACT

A position error estimation device including an image acquisition part acquiring an image of surroundings of a mobile object captured by an imager on the mobile object; an environmental map data creation part creating environmental map data from the image; and an own position estimation part calculating a current own position of the mobile object from the image captured after the environmental map data is created. The own position estimation part includes: a first error calculator calculating a first error of the own position from an error related to a map point calculated when the environmental map data is created; a second error calculator calculating a second error of the own position from the image captured while the mobile object is moving from positions and postures of the imaging part; and a third error calculator calculating a third error of the own position including the first and second errors.

4 Claims, 5 Drawing Sheets

(58) Field of Classification Search

CPC ... G06T 2207/30244; G06T 7/73; G06T 7/80; G09B 29/00

See application file for complete search history.

(56) References Cited

U.S. PATENT DOCUMENTS

| | | | | |
|---|---|---|---|---|
| 10,809,064 | B2 * | 10/2020 | Ingersoll | G01C 21/1656 |
| 10,962,647 | B2 * | 3/2021 | Shin | G01S 17/04 |
| 11,243,086 | B2 * | 2/2022 | Yu | G01C 21/3867 |
| 12,045,056 | B2 * | 7/2024 | Suzuki | G05D 1/0274 |
| 2010/0324815 | A1 * | 12/2010 | Hiruta | G01C 21/30 |
| | | | | 701/532 |
| 2014/0067256 | A1 * | 3/2014 | Aoki | G01C 21/30 |
| | | | | 701/518 |
| 2019/0019062 | A1 | 1/2019 | Fukui | |
| 2021/0156711 | A1 * | 5/2021 | Flade | G01C 25/00 |

FOREIGN PATENT DOCUMENTS

| | | | | |
|---|---|---|---|---|
| JP | 2018-058398 A | | 4/2018 | |
| KR | 20190131402 A | * | 11/2019 | ............ G06T 5/001 |
| WO | 2017/168899 A1 | | 10/2017 | |
| WO | WO-2020259248 A1 | * | 12/2020 | ........... G06V 10/757 |

OTHER PUBLICATIONS

"Li, Bing; et. al.; Collaborative Mapping and Autonomous Parking for Multi-story Parking Garage; 2018; IEEE Transactions On Intelligent Transportation Systems" (Year: 2018).*

"Sanfourche, M; et. al.; Perception for UAV: Vision-Based Navigation and Environment Modeling; May 2012; Journal Aerospace Lab" (Year: 2012).*

International Search Report for PCT/JP2023/005161 dated May 16, 2023 (PCT/ISA/210).

* cited by examiner

OWN POSITION ERROR ESTIMATION DEVICE AND OWN POSITION ERROR ESTIMATION METHOD

CROSS REFERENCE TO RELATED APPLICATIONS

This application is a National Stage of International Application No. PCT/JP2023/005161 filed Feb. 15, 2023, claiming priority based on Japanese Patent Application No. 2022-059992 fled Mar. 31, 2022, the entire contents of which are incorporated in their entirety.

TECHNICAL FIELD

Embodiments of the present disclosure relate to an own position error estimation device and an own position error estimation method.

BACKGROUND ART

Conventionally, in a technique for estimating a current own position of a mobile object on the basis of map data created in advance and an image captured by an imaging part, a technique for calculating an error of the estimated own position of the mobile object is known.

CITATION LIST

Patent Literature

Patent Literature 1: WO 2017/168899 A

SUMMARY OF THE DISCLOSURE

Technical Problems

In the above technique, however, the error of the map data is not considered in calculating the error of the own position of the mobile object, and thus there is a problem that the accuracy of the error of the own position is low.

Therefore, one of the challenges of an embodiment is to obtain an own position error estimation device and an own position error estimation method that can calculate an error of the own position of a mobile object with high accuracy.

Solutions to Problems

An own position error estimation device according to an embodiment includes: an image acquisition part configured to acquire an image of surroundings of a mobile object captured by an imaging part mounted on the mobile object; an environmental map data creation part configured to create environmental map data on the basis of the image; and an own position estimation part configured to calculate a current own position of the mobile object on the basis of the image captured after the environmental map data is created and the environmental map data, in which the own position estimation part includes: a first error calculation part configured to calculate a first error of the own position on the basis of an error related to a map point calculated when the environmental map data is created; a second error calculation part configured to calculate a second error of the own position from the image captured while the mobile object is moving on the basis of a plurality of positions and postures of the imaging part; and a third error calculation part configured to calculate a third error of the own position including the first error and the second error.

According to such a configuration, the third error calculation part calculates the third error of the own position including the first error of the own position based on the error of the map data, so that the error (third error) of the own position of the mobile object can be calculated with high accuracy.

In addition, in the own position error estimation device, the environmental map data, for example, is created, from the image captured while the mobile object is moving, by triangulation on the basis of the plurality of positions and postures of the imaging part.

In addition, in the own position error estimation device, the environmental map data, for example, is created on the basis of a plurality of key frames that are a plurality of the images captured at time and/or distance intervals for creating the environmental map data, and does not include first error information indicating the first error at a position of the mobile object when the key frame is captured, and the first error calculation part calculates the first error when an own position calculation image, which is the image for calculating the own position, is captured.

According to such a configuration, the first error calculation part calculates the first error when the own position calculation image, which is the image for calculating the own position, is captured, so that the first error of the mobile object at the position where the image is captured can be calculated with high accuracy.

In addition, in the own position error estimation device, the environmental map data, for example, is created on the basis of a plurality of key frames, which are a plurality of the images captured at time and/or distance intervals for creating the map data, and includes key frame captured position information indicating the position of the mobile object when the key frame is captured and first error information indicating the first error at the position indicated by the key frame captured position information, and the first error calculation part calculates the first error on the basis of the error of the own position in the key frame whose position is the closest, among a plurality of the key frames, to the own position when an own position calculation image, which is the image for calculating the own position, is captured.

According to such a configuration, the first error calculation part calculates the first error of the own position when the own position calculation image is captured on the basis of the first error information included in the map data, so that the time required for the processing of calculating the error of the own position can be shortened.

An own position error estimation method according to an embodiment includes the steps of: acquiring, by an image acquisition part, an image of surroundings of a mobile object captured by an imaging part mounted on the mobile object; creating, by an environmental map data creation diagram, environmental map data on the basis of the image; and calculating, by an own position estimation part, a current own position of the mobile object on the basis of the image captured after the environmental map data is created and the environmental map data, in which the step of calculating a current own position of the mobile object includes the steps of: calculating, by a first error calculation part, a first error of the own position on the basis of an error related to a map point calculated when the environmental map data is created; calculating, by a second error calculation part, a second error of the own position from the image captured while the mobile object is moving on the basis of a plurality of positions and postures of the imaging part; and calculating, by a third error calculation part, a third error of the own position including the first error and the second error.

According to such a configuration, the first error calculation part calculates the first error when the own position calculation image, which is the image for calculating the own position, is captured, so that the error (third error) of the mobile object at the position where the image is captured can be calculated with high accuracy.

BRIEF DESCRIPTION OF DRAWINGS

FIG. 1 is a perspective view illustrating an example of a state in which a part of a vehicle interior of a vehicle according to the present embodiment is seen through.

DESCRIPTION OF EMBODIMENTS

Hereinafter, exemplary embodiments of the present disclosure will be disclosed. The configurations of the embodiments described below, and the actions, results, and effects brought by the configurations are examples. The aspects of the present disclosure can be realized by configurations other than those disclosed in the following embodiments, and at least one of various effects based on the basic configurations and derivative effects can be obtained.

A vehicle according to the present embodiment may be a car (internal combustion engine car) using an internal combustion engine (engine) as a driving source, may be a car (electric car, fuel cell car, or the like) using an electric motor (motor) as a driving source, or may be a car (hybrid car) using both of them as driving sources. In addition, the vehicle can be equipped with various shift devices and various devices (systems, components, etc.) necessary for driving the internal combustion engine and the electric motor. In addition, the types, numbers, layouts, and others of devices related to driving wheels in the vehicle can be variously set.

Figure 1:
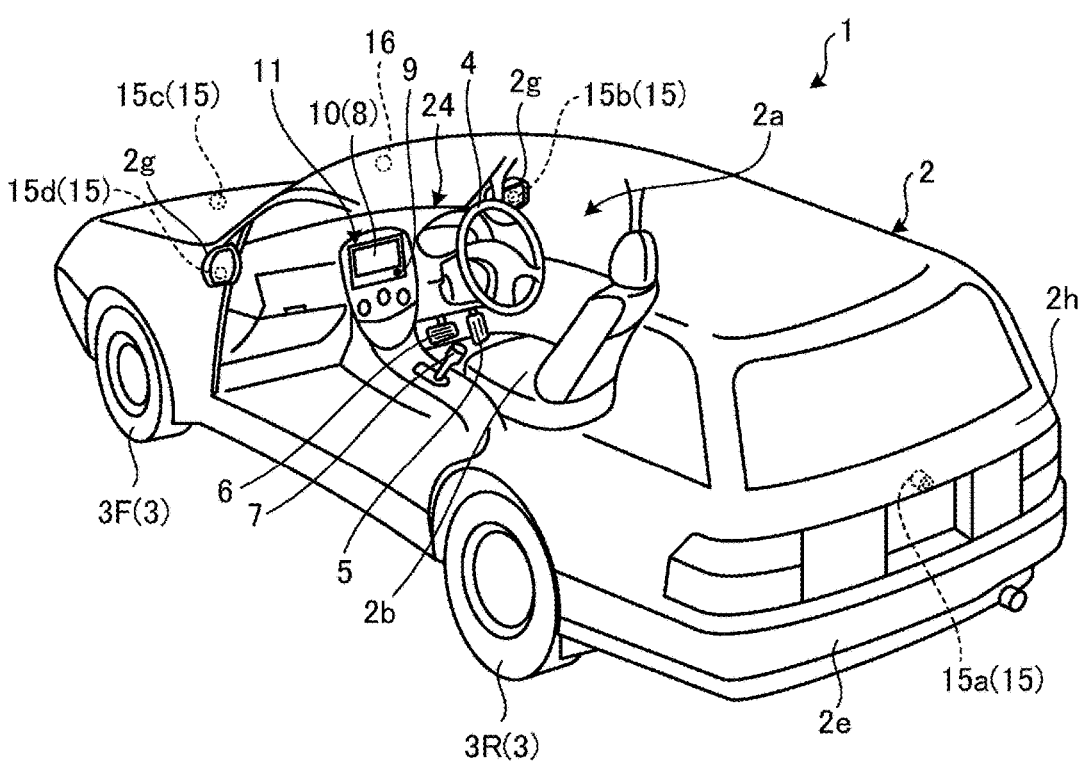

FIG. 1 is a perspective view illustrating an example of a state in which a part of a vehicle interior of a vehicle according to the present embodiment is seen through. As illustrated in FIG. 1, a vehicle 1 includes a vehicle body 2, a steering part 4, an acceleration operation part 5, a braking operation part 6, a shift operation part 7, and a monitor device 11. The vehicle body 2 has a vehicle interior 2a where an occupant rides. In the vehicle interior 2a, the steering part 4, the acceleration operation part 5, the braking operation part 6, the shift operation part 7, and the like are provided in a state where a driver as the occupant faces a seat 2b. The steering part 4 is, for example, a steering wheel protruding from a dashboard 24. The acceleration operation part 5 is, for example, an accelerator pedal positioned at the feet of the driver. The braking operation part 6 is, for example, a brake pedal positioned at the feet of the driver. The shift operation part 7 is, for example, a shift lever protruding from the center console. The vehicle 1 is an example of a mobile object.

The monitor device 11 is provided, for example, at the center, in the vehicle width direction (i.e., in the left-right direction), of the dashboard 24. The monitor device 11 may have a function of, for example, a navigation system or an audio system. The monitor device 11 includes a display device 8, a sound output device 9, and an operation input part 10. In addition, the monitor device 11 may include various operation input parts such as a switch, a dial, a joystick, and a push button.

The display device 8 includes a liquid crystal display (LCD), an organic electroluminescent display (OELD), or the like, and can display various images on the basis of image data. The sound output device 9 includes a speaker and the like, and outputs various sounds on the basis of sound data. In the vehicle interior 2a, the sound output device 9 may be provided at a different position other than the monitor device 11.

The operation input part 10 includes a touch panel or the like, and enables the occupant to input various types of information. In addition, the operation input part 10 is provided on the display screen of the display device 8, and can transmit an image displayed on the display device 8. As a result, the operation input part 10 enables the occupant to visually recognize the image displayed on the display screen of the display device 8. The operation input part 10 detects a touch operation by the occupant on the display screen of the display device 8, whereby inputs of various types of information by the occupant are received.

Figure 2:
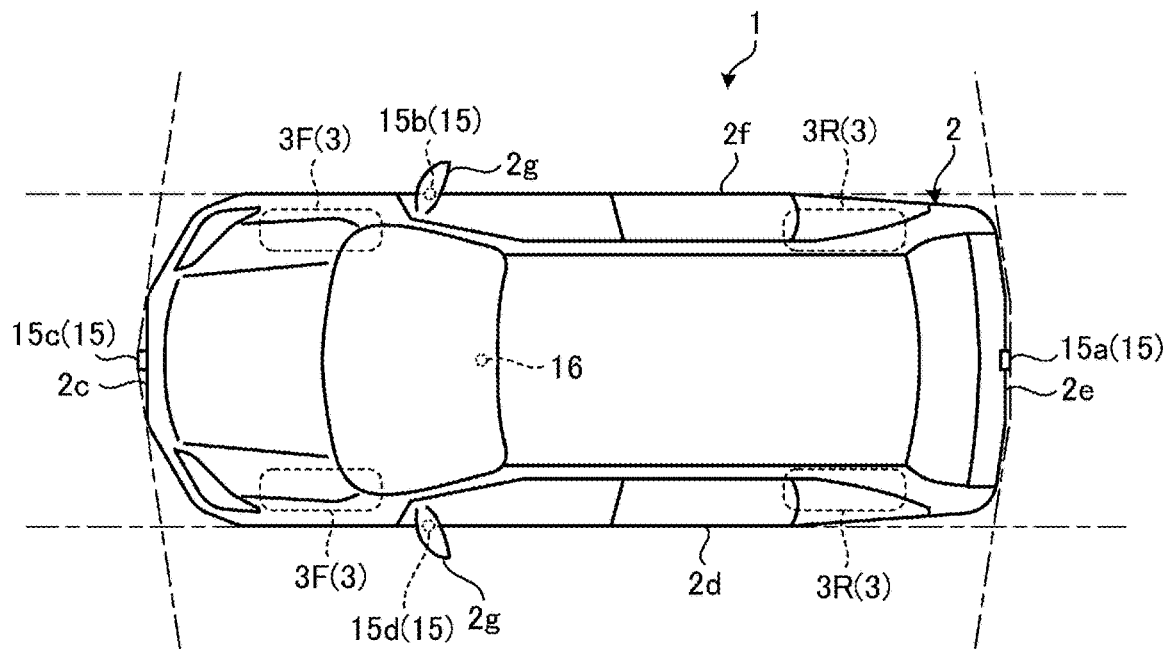
FIG. 2 is a plan view of an example of the vehicle according to the present embodiment.

FIG. 2 is a plan view of an example of the vehicle according to the present embodiment. As illustrated in FIGS. 1 and 2, the vehicle 1 is a four-wheeled car or the like, and includes two left and right front wheels 3F and two left and right rear wheels 3R. All or a part of the four wheels 3 can be steered.

The vehicle 1 is equipped with a plurality of imaging parts 15 (in-vehicle cameras). In the present embodiment, the vehicle 1 is equipped with, for example, four imaging parts 15a to 15d. The imaging part 15 is a digital camera including an imaging element such as a charge coupled device (CCD) or a CMOS image sensor (CIS). The imaging part 15 can image the surroundings of the vehicle 1 at a predetermined frame rate. Then, the imaging part 15 outputs the captured image obtained by imaging the surroundings of the vehicle 1. Each of the imaging parts 15 includes a wide-angle lens or a fisheye lens, and can image a range of, for example, 140° to 220° in the horizontal direction. In addition, the optical axis of the imaging part 15 may be set obliquely downward.

Specifically, the imaging part 15a is, for example, located at an end portion 2e on the rear side of the vehicle body 2 and provided on a wall portion below the rear window of a door 2h of the rear hatch. Then, the imaging part 15a can image a region behind the vehicle 1 among the surroundings of the vehicle 1. The imaging part 15b is, for example, located at an end portion 2f on the right side of the vehicle body 2 and provided on a door mirror 2g on the right side. Then, the imaging part 15b can image a region on the side of the vehicle among the surroundings of the vehicle 1. The imaging part 15c is, for example, located on the front side of the vehicle body 2, that is, at an end portion 2c on the front side, in the front-rear direction, of the vehicle 1 and provided on the front bumper, the front grille, or the like. Then, the imaging part 15c can image a region in front of the vehicle 1 among the surroundings of the vehicle 1. The imaging part 15*d* is, for example, located on the left side of the vehicle body 2, that is, at an end portion 2*d* on the left side in the vehicle width direction and provided on a door mirror 2*g* on the left side. Then, the imaging part 15*d* can image a region on the side of the vehicle 1 among the surroundings of the vehicle 1.

Figure 3:
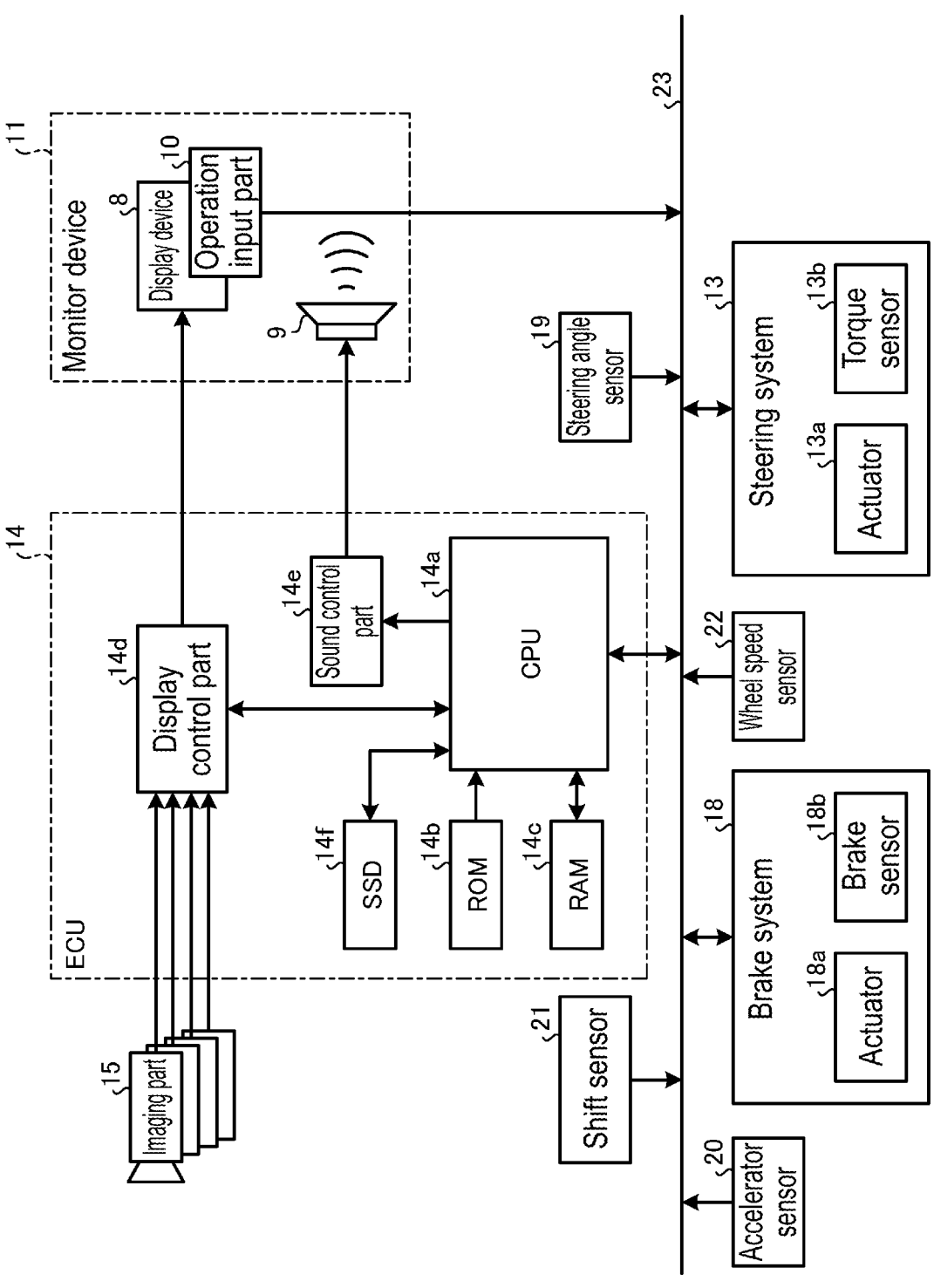
FIG. 3 is a block diagram illustrating an example of a functional configuration of the vehicle according to the present embodiment.

FIG. 3 is a block diagram illustrating an example of a functional configuration of the vehicle according to the present embodiment. Next, an example of a functional configuration of the vehicle 1 according to the present embodiment will be described with reference to FIG. 3.

As illustrated in FIG. 3, the vehicle 1 includes a steering system 13, a brake system 18, a steering angle sensor 19, an accelerator sensor 20, a shift sensor 21, a wheel speed sensor 22, an in-vehicle network 23, and an electronic control unit (ECU) 14.

The monitor device 11, the steering system 13, the brake system 18, the steering angle sensor 19, the accelerator sensor 20, the shift sensor 21, the wheel speed sensor 22, and the ECU 14 are electrically connected via the in-vehicle network 23 that is an electric communication line. The in-vehicle network 23 includes a controller area network (CAN) or the like.

The steering system 13 is an electric power steering system, a steer by wire (SBW) system, or the like. The steering system 13 includes an actuator 13*a* and a torque sensor 13*b*. Then, the steering system 13 is electrically controlled by the ECU 14 or the like, and operates the actuator 13*a* to supplement steering force by adding torque to the steering part 4, thereby steering the wheels 3. The torque sensor 13*b* detects the torque applied to the steering part 4 by a driver, and transmits a detection result thereof to the ECU 14.

The brake system 18 includes an anti-lock brake system (ABS) that controls the locking of the brake of the vehicle 1, an electronic stability control (ESC) that suppresses skidding of the vehicle 1 during cornering, an electric brake system that reinforces braking force to assist the brake, and a brake by wire (BBW).

The brake system 18 includes an actuator 18*a* and a brake sensor 18*b*. The brake system 18 is electrically controlled by the ECU 14 or the like, and applies braking force to the wheels 3 via the actuator 18*a*. The brake system 18 detects the locking of the brake, idling of the wheels 3, a sign of skidding, and the like from a difference between the rotations of the left and right wheels 3, and the like, and executes control to suppress the locking of the brake, the idling of the wheels 3, and the skidding. The brake sensor 18*b* is a displacement sensor that detects the position of a brake pedal as a movable portion of the braking operation part 6, and transmits a detection result of the position of the brake pedal to the ECU 14.

The steering angle sensor 19 is a sensor that detects a steering amount of the steering part 4 such as a steering wheel. In the present embodiment, the steering angle sensor 19 includes a Hall element or the like, detects the rotation angle of the rotating portion of the steering part 4 as the steering amount, and transmits a detection result thereof to the ECU 14.

The accelerator sensor 20 is a displacement sensor that detects the position of the accelerator pedal as a movable portion of the acceleration operation part 5, and transmits a detection result thereof to the ECU 14.

The shift sensor 21 is a sensor that detects the position of a movable portion (bar, arm, button, or the like) of the shift operation part 7, and transmits a detection result thereof to the ECU 14.

The wheel speed sensor 22 is a sensor that has a Hall element or the like and detects the rotation amount of the wheel 3 or the rotation speed of the wheel 3 per unit time, and transmits a detection result thereof to the ECU 14.

The ECU 14 includes a computer and the like, and performs overall control of the vehicle 1 by cooperation of hardware and software. Specifically, the ECU 14 includes a central processing unit (CPU) 14*a*, a read only memory (ROM) 14*b*, a random access memory (RAM) 14*c*, a display control part 14*d*, a sound control part 14*e*, and a solid state drive (SSD) 14*f*. The CPU 14*a*, the ROM 14*b*, and the RAM 14*c* may be provided in the same circuit board.

The CPU 14*a* reads a program stored in a nonvolatile storage device such as the ROM 14*b*, and executes various types of arithmetic processing in accordance with the program. The CPU 14*a*, for example, executes image processing on image data to be displayed on the display device 8, control of traveling of the vehicle 1 in accordance with a target route to a target position such as a parking position, processing related to calibration of the imaging part 15, and the like.

The ROM 14*b* stores various programs, parameters necessary for executing the programs, and the like.

The RAM 14*c* temporarily stores various data to be used in the calculation in the CPU 14*a*.

Among the arithmetic processing in the ECU 14, the display control part 14*d* mainly executes image processing on the image data acquired from the imaging part 15 and to be output to the CPU 14*a*, conversion of the image data acquired from the CPU 14*a* into display image data to be displayed on the display device 8, and the like.

Among the arithmetic processing in the ECU 14, the sound control part 14*e* mainly executes processing of sound acquired from the CPU 14*a* and to be output to the sound output device 9.

The SSD 14*f* is a rewritable nonvolatile storage part, and continues to store data acquired from the CPU 14*a* even when the power supply of the ECU 14 is turned off.

Figure 4:
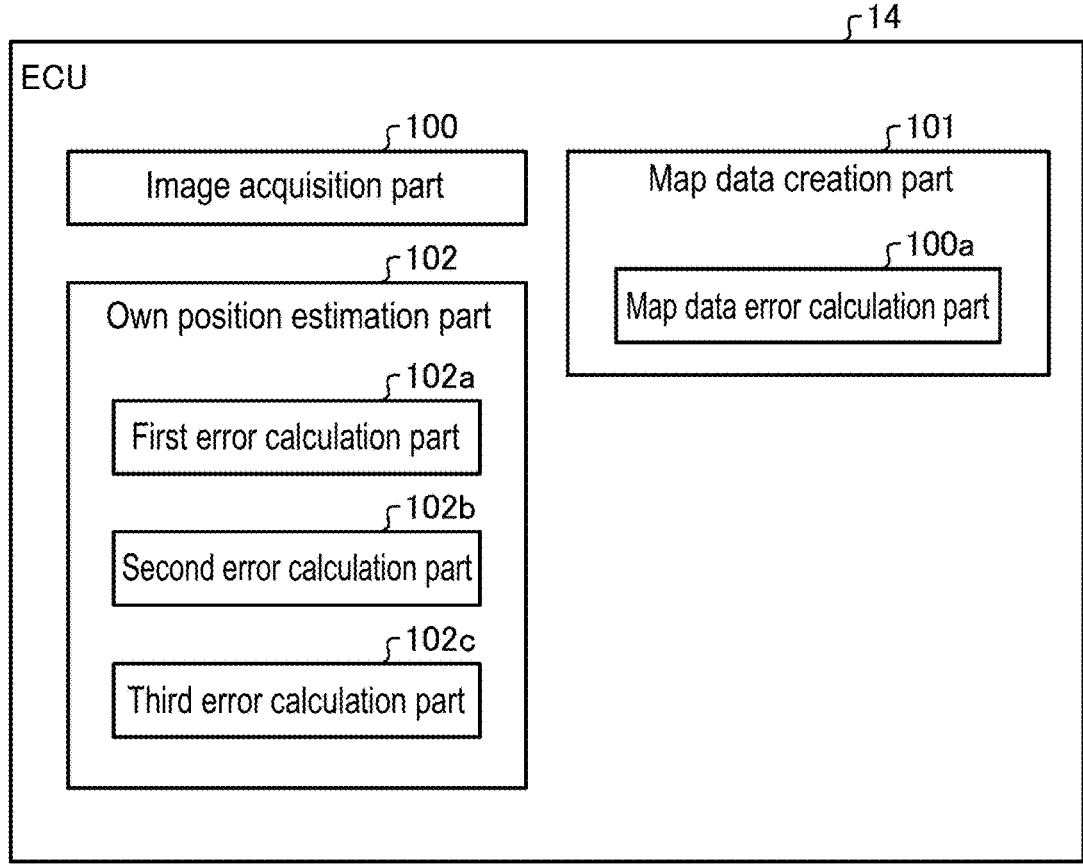
FIG. 4 is a block diagram illustrating an example of a functional configuration of an ECU included in the vehicle according to the present embodiment.

FIG. 4 is a block diagram illustrating an example of a functional configuration of an ECU included in the vehicle according to the present embodiment.

Next, an example of a functional configuration of the ECU 14 included in the vehicle 1 according to the present embodiment will be described with reference to FIG. 4. The ECU 14 is an example of an own position error estimation device, and executes an own position error estimation method.

As illustrated in FIG. 4, the ECU 14 includes a map data creation part 101, an image acquisition part 100, an image acquisition part 100, and an own position estimation part 102. The map data creation part 101 includes a map data error calculation part 100*a*. The own position estimation part 102 includes a first error calculation part 102*a*, a second error calculation part 102*b*, and a third error calculation part 102*c*.

For example, a processor, such as the CPU 14*a*, mounted on a circuit board executes a program stored in a storage medium such as the ROM 14*b* or the SSD 14*f*, whereby the ECU 14 implements the functions of the map data creation part 101, the image acquisition part 100, and the own position estimation part 102. A part or all of the map data creation part 101, the image acquisition part 100, and the own position estimation part 102 may be configured by hardware such as circuits.

The image acquisition part 100 acquires an image (frame) obtained by the imaging part 15 imaging the surroundings of the vehicle 1 (an example of a mobile object). Hereinafter, the image is also referred to as a frame. In the present embodiment, the image acquisition part 100 acquires a frame from the imaging part 15 when the vehicle 1 moves.

The map data creation part 101 extracts feature points existing in a plurality of key frames, which are frames at predetermined timings among the captured images, and creates map data on the basis of the feature points. Here, the map data is map data (e.g., three-dimensional map data) of the surroundings of the vehicle 1. In addition, the map data indicates position posture information indicating the own position of the imaging part 15 and the posture of the imaging part 15.

The map data creation part 101, for example, creates the map data by visual simultaneous localization and mapping (SLAM). Specifically, the map data creation part 101 extracts the feature points from the frames captured by the imaging part 15. Next, the map data creation part 101 creates the map data by obtaining distances between the imaging part 15 and the feature points by triangulation on the basis of the position posture information of the imaging part 15 and the extracted feature points. The map data indicates map points in three-dimensional coordinates predefined for an object.

Figure 5:
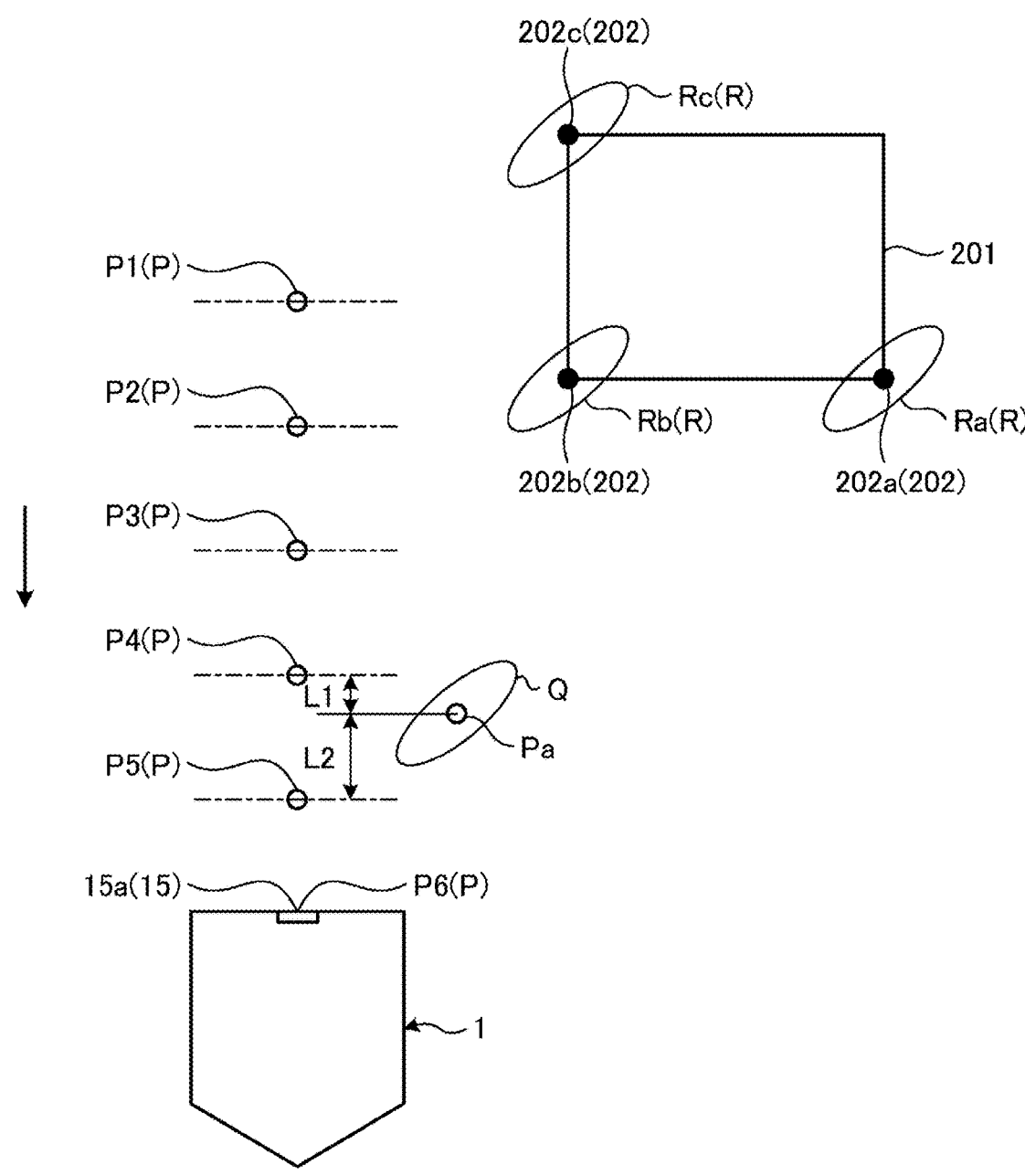
FIG. 5 is a view for explaining an example of processing of creating surrounding map data by the ECU included in the vehicle according to the present embodiment.

FIG. 5 is a view for explaining an example of processing of creating surrounding map data by the ECU included in the vehicle according to the present embodiment. FIG. 5 illustrates an example in which, when the vehicle 1 moves from an actual position P1 to P6 and when the imaging part, the imaging part captures images at the respective positions P1 to P6, the positions of feature points 202*a* to 202*c* of an object 201 are calculated. Hereinafter, a position P is used as a generic name for the positions P, and a feature point 202 is used as a generic name for the feature points 202*a* to 202*c*. The feature point 202 constitutes a map point.

The map data includes an error (variation) of the position of the feature point 202 (i.e., the map point) as an error of the map data. Here, the error is an error with respect to the determined position of the feature point 202 (map point). In FIG. 5, error ranges of the positions of the respective feature points 202*a* to 202*c* are schematically illustrated by regions 2Ra to Rc. A region R is used as a generic name for the regions Ra to Rc. The map data is created by SLAM as described above, but in this case, a variance-covariance matrix regarding the feature point 202 (map point) is calculated by a known method in the process of creating the map data by SLAM. This variance-covariance matrix represents an error of the position of the feature point 202 (map point). This error is calculated by the map data error calculation part 100*a* of the map data creation part 101. In other words, the map data error calculation part 100*a* obtains how correct (accuracy) the position of the map point is with respect to the correct position. That is, the map data error calculation part 100*a* estimates an error with respect to the correct position of the map point.

Returning to FIG. 4, after the map data is created, the own position estimation part 102 estimates (calculates) the current own position of the vehicle 1 on the basis of the image of the surroundings of the vehicle 1 captured by the imaging part 15 and the map data. The own position estimation part 102 extracts the feature point of the image, performs matching between the feature point and the map point that is a point in the map data, and estimates, on the basis of the matching result, the position posture of the imaging part, that is, the position posture of the vehicle 1. Here, the three-dimensional map indicates map points in three-dimensional coordinates predefined for an object.

When calculating the current own position of the vehicle 1 on the basis of the image and the map data, the first error calculation part 102*a* calculates a first error of the own position on the basis of the error of the map data. The second error calculation part 102*b* calculates a second error of the own position when it is assumed that there is no error of the map data. The first error and the second error of the own position are errors (variations) with respect to the determined own position calculated by the own position estimation part 102. In other words, when calculating the current own position of the vehicle 1 on the basis of the image and the map data, the first error calculation part 102*a* obtains, on the basis of the error of the map data, how correct the own position is with respect to the correct position. That is, the first error calculation part 102*a* estimates, on the basis of the error of the map data, an error with respect to the correct position of the own position. In addition, the second error calculation part 102*b* obtains how correct the own position is with respect to the correct position when it is assumed that there is no error of the map data. That is, the second error calculation part 102*b* estimates an error of the own position with respect to the correct position when it is assumed that there is no error of the map data.

A method of calculating the first error and the second error will be described. First, the second error will be described. The second error is calculated in the process of calculating the own position. In calculating the own position, optimization processing is executed, by a known method, on the posture and position of the imaging part 15 to be calculated. Here, the posture and position (initial posture and position) of the imaging part 15 before being optimized are set to (R0, t0), and a set of the map points that are matched before being optimized is set to S0. Optimization that minimizes reprojection errors of four times (i=1, 2, 3, 4) is performed on (R0, t0). In the i-th optimization, the reprojection errors are calculated for all the map points of Si−1, and those less than or equal to a threshold are included in Si as inliers. The variance-covariance matrix is calculated when the reprojection errors are calculated for S4. This variance-covariance matrix is decomposed into a position and a posture. The portion of the position and the posture in the variance-covariance matrix represents the second error.

Regarding the first error, optimization to minimize the following reprojection errors of ten times is performed on S4 obtained in the process of calculating the second error. At this time, the initially estimated position and posture of the imaging part 15 before being optimized are (R0, t0). Noise that follows a normal distribution is added to each map point. The noise that follows a normal distribution is a variance-covariance matrix of the map points calculated when the map data is created. Then, the variance-covariance matrix is calculated when the reprojection error for S4 is calculated. The variance-covariance matrices of ten times are integrated, and the variance-covariance matrix is decomposed into a position and a posture. The portion of the position and posture in the variance-covariance matrix represents the first error. In FIG. 5, the range of the first error is schematically illustrated by a region Q. Note that inliers/outliers are not determined in calculating the first error.

The third error calculation part 102*c* calculates a third error of the own position including the first error and the second error. Specifically, the third error is obtained by adding the first error to the second error.

The ECU 14 can perform autonomous driving of the vehicle 1 using the own position estimated by the own position estimation part 102.

Figure 6:
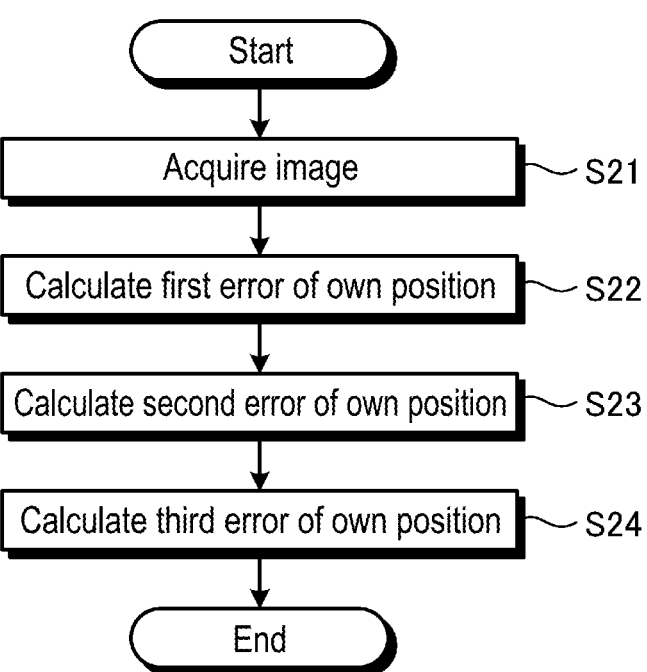
FIG. 6 is a flowchart illustrating an example of a flow of processing of calculating an error of an own position of a vehicle by the ECU included in the vehicle according to the present embodiment.

FIG. 6 is a flowchart illustrating an example of a flow of processing of calculating an error of an own position of a vehicle by the ECU included in the vehicle according to the present embodiment.

Next, an example of a flow of processing of calculating an error of the own position of the vehicle 1 by the ECU 14 included in the vehicle 1 according to the present embodiment will be described with reference to FIG. 6.

The image acquisition part 100 acquires, from the imaging part 15, an image captured by the imaging part 15 while the vehicle 1 is moving (step S21).

Next, the first error calculation part 102*a* calculates the first error of the own position on the basis of the error of the map data (S22). Next, the second error calculation part 102*b* calculates the second error of the own position when it is assumed that there is no error of the map data (S23). Next, the third error calculation part 102*c* calculates the third error of the own position including the first error and the second error (S24).

As described above, the ECU 14 (own position error estimation device) of the present embodiment includes the image acquisition part 100, the first error calculation part 102*a*, the second error calculation part 102*b*, and the third error calculation part 102*c*. The image acquisition part 100 acquires an image of the surroundings of the vehicle 1 captured by the imaging part 15 mounted on the vehicle 1 (mobile object). When calculating the current own position of the vehicle 1 on the basis of the image and the map data, the first error calculation part 102*a* calculates a first error of the own position on the basis of the error of the map data. The second error calculation part 102*b* calculates a second error of the own position when it is assumed that there is no error of the map data. The third error calculation part 102*c* calculates a third error of the own position including the first error and the second error.

According to such a configuration, the third error calculation part 102*c* calculates the third error of the own position including the first error of the own position based on the error of the map data, so that the error (third error) of the own position of the vehicle 1 can be calculated with high accuracy.

In addition, the map data is created based on a plurality of key frames, which are a plurality of images captured at time and/or distance intervals for creating the map data, and does not include first error information indicating the first error at the position of the vehicle 1 when the key frame is captured. The first error calculation part 102*a* calculates the first error when an own position calculation image, which is the image for calculating the own position, is captured.

According to such a configuration, the first error calculation part 102*a* calculates the first error when the own position calculation image, which is the image for calculating the own position, is captured, so that the own position of the vehicle 1 at the position where the image is captured can be calculated with high accuracy.

Next, a modification of the present embodiment will be described. In the present modification, the first error is calculated when map data is created. The map data is created based on a plurality of key frames that are a plurality of the images captured at time and/or distance intervals for creating the map data. The map data includes key frame captured position information and first error information. The key frame captured position information indicates the position of the vehicle 1 when the key frame is captured. The first error information indicates the first error at the position indicated by the key frame captured position information.

In the present modification, the first error calculation part 102*a* calculates the first error on the basis of the error of an own position in a key frame whose position is closest to an own position when an own position calculation image, which is the image for calculating the own position among the plurality of key frames, is captured. Specifically, when the vehicle 1 captures an image at a position Pa, two key frames whose captured positions are the closest to and the second closest to the position Pa are extracted, as illustrated in FIG. 5. In the example of FIG. 5, those are the key frames captured at positions P4 and P5. Then, the first error of the position Pa is calculated using first errors obtained for the key frames at the position P4 and the position P5 with respect to the position Pa. When it is assumed, for example, that the distance between the position Pa and the position P4 is L1, the distance between the position Pa and the position P5 is L2, and the first errors at the positions Pa, P4, and P5 are Ma, M4, and M5, respectively, Ma is obtained by the following equation.

$$Ma = M4 \times (L2/(L1+L2)) + M5 \times (L1/(L1+L2))$$

According to such a configuration, the first error calculation part 102*a* calculates the first error of the own position when the own position calculation image is captured on the basis of the first error information included in the map data, so that the time required for the processing of calculating the error of the own position can be shortened.

The ECU 14 (own position error estimation device) according to the embodiment includes the steps of: acquiring, by the image acquisition part 100, an image of the surroundings of the vehicle 1 captured by the imaging part 15 mounted on the vehicle 1 (mobile object); calculating, by the first error calculation part 102*a* and when an own position that is the position of the vehicle 1 is calculated on the basis of the image and map data, a first error of the own position on the basis of an error of the map data; a second error calculation part 102*b* configured to calculate a second error of the own position when it is assumed that there is no error of the map data; and calculating, by the third error calculation part 102*c*, a third error of the own position including the first error and the second error.

According to such a configuration, the first error calculation part 102*a* calculates the first error when the own position calculation image, which is the image for calculating the own position, is captured, so that the first error of the vehicle 1 at the position where the image is captured can be calculated with high accuracy.

In the above embodiment, the example of the vehicle 1 is shown as a mobile object, but the present disclosure is not limited thereto. For example, the mobile object may be a flying object such as a drone.

Although the embodiments of the present disclosure have been illustrated above, the above embodiments are merely examples, and are not intended to limit the scope of the disclosure. The embodiments can be implemented in various other forms, and various omissions, substitutions, combinations, or changes can be made without departing from the gist of the disclosure.

The invention claimed is:

1. An own position error estimation device comprising:
an image acquisition part configured to acquire an image of surroundings of a mobile object captured by an imaging part mounted on the mobile object;

an environmental map data creation part configured to create environmental map data on the basis of the image;

an own position estimation part configured to calculate a current own position of the mobile object on the basis of the image captured after the environmental map data is created and the environmental map data, wherein the own position estimation part includes:

a first error calculation part configured to calculate a first error of the own position on the basis of an error related to a map point calculated when the environmental map data is created;

a second error calculation part configured to calculate a second error of the own position from the image captured while the mobile object is moving on the basis of a plurality of positions and postures of the imaging part; and a third error calculation part configured to calculate a third error of the own position including the first error and the second error; and a control part configured to autonomously control the mobile object using the third error of the own position, wherein the environmental map data is created on the basis of a plurality of key frames that are a plurality of the images captured at time and/or distance intervals for creating the environmental map data, and does not include first error information indicating the first error at a position of the mobile object when the key frame is captured, and the first error calculation part calculates the first error when an own position calculation image, which is the image for calculating the own position, is captured.

2. The own position error estimation device according to claim 1, wherein the environmental map data is created, from the image captured while the mobile object is moving, by triangulation on the basis of the plurality of positions and postures of the imaging part.

3. An own position error estimation device comprising:

an image acquisition part configured to acquire an image of surroundings of a mobile object captured by an imaging part mounted on the mobile object;

an environmental map data creation part configured to create environmental map data on the basis of the image;

an own position estimation part configured to calculate a current own position of the mobile object on the basis of the image captured after the environmental map data is created and the environmental map data, wherein the own position estimation part includes:

a first error calculation part configured to calculate a first error of the own position on the basis of an error related to a map point calculated when the environmental map data is created;

a second error calculation part configured to calculate a second error of the own position from the image captured while the mobile object is moving on the basis of a plurality of positions and postures of the imaging part; and a third error calculation part configured to calculate a third error of the own position including the first error and the second error; and a control part configured to autonomously control the mobile object using the third error of the own position, wherein the environmental map data is created on the basis of a plurality of key frames, which are a plurality of the images captured at time and/or distance intervals for creating the environmental map data, and includes key frame captured position information indicating the position of the mobile object when the key frame is captured and first error information indicating the first error at the position indicated by the key frame captured position information, and the first error calculation part calculates the first error on the basis of the error of the own position in the key frame whose position is the closest, among a plurality of the key frames, to the own position when an own position calculation image, which is the image for calculating the own position, is captured.

4. An own position error estimation method comprising the steps of:

acquiring, by an image acquisition part, an image of surroundings of a mobile object captured by an imaging part mounted on the mobile object;

creating, by an environmental map data creation diagram, environmental map data on the basis of the image;

calculating, by an own position estimation part, a current own position of the mobile object on the basis of the image captured after the environmental map data is created and the environmental map data, wherein the step of calculating a current own position of the mobile object includes the steps of:

calculating, by a first error calculation part, a first error of the own position on the basis of an error related to a map point calculated when the environmental map data is created;

calculating, by a second error calculation part, a second error of the own position from the image captured while the mobile object is moving on the basis of a plurality of positions and postures of the imaging part; and calculating, by a third error calculation part, a third error of the own position including the first error and the second error;

and autonomously controlling the mobile object using the third error of the own position, wherein the environmental map data is created on the basis of a plurality of key frames that are a plurality of the images captured at time and/or distance intervals for creating the environmental map data, and does not include first error information indicating the first error at a position of the mobile object when the key frame is captured, and the first error calculation part calculates the first error when an own position calculation image, which is the image for calculating the own position, is captured.

* * * * *